April 6, 1954     F. G. PRIEBE     2,674,687
ILLUMINATED BASE FOR ARTIFICIAL TREES
Filed May 13, 1952

Frederick G. Priebe
INVENTOR.

BY *Clarence A. O'Brien*
*and Harvey B. Jackson*
Attorneys

Patented Apr. 6, 1954

2,674,687

UNITED STATES PATENT OFFICE 2,674,687

ILLUMINATED BASE FOR ARTIFICIAL TREES

Frederick G. Priebe, Shillington, Pa., assignor of one-third to William J. Priebe Application May 13, 1952, Serial No. 287,463

2 Claims. (Cl. 240—10)

The present invention relates to supporting stands or bases for trees and more particularly to a stand or base having cooperative illuminating means and reflective surfaces thereon for indirectly illuminating a tree supported thereby.

At the present time there are on the market several varieties of plastic trees having a number of different types of supporting means, either integral with the tree or otherwise, which trees have achieved widespread use as Christmas trees and the like. It is the primary object of this invention to provide an illuminated stand or base in which such trees may be disposed for illumination thereby.

An important object of this invention is to provide an illuminated stand for artificial trees having a novel means for inserting and removing the lower portion of the artificial tree.

Another important object of this invention is to provide a stand including an outer receptacle and a novel inner housing having illuminating means therein, which housing incloses the lower portion of a tree trunk and has a plurality of openings therein for projecting light into the receptacle.

It is a further object of the present invention, ancillary to the preceding objects, to provide a plurality of upwardly diverging reflecting surfaces within the receptacle and spacedly surrounding the housing to reflect light or illumination projected from the openings in the housing substantially conically upwardly from the receptacle.

These, together with various ancillary features and objects of the invention which will later become apparent as the following description proceeds, are attained by this device, a preferred embodiment of which is to be illustrated by way of example only in the accompanying drawings, wherein.

Figure 1:
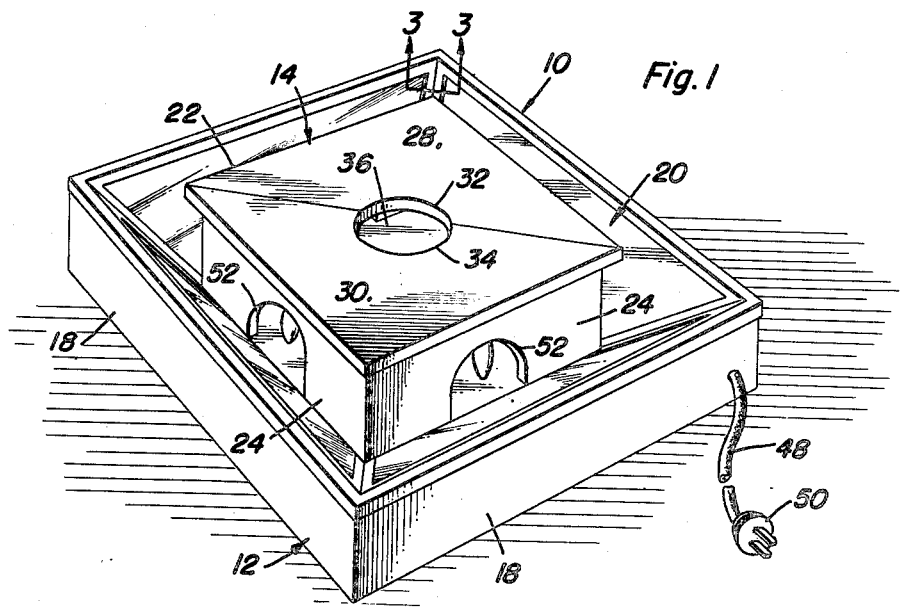
Figure 1 is a perspective view of the tree supporting stand in its entirety.
Figure 2:
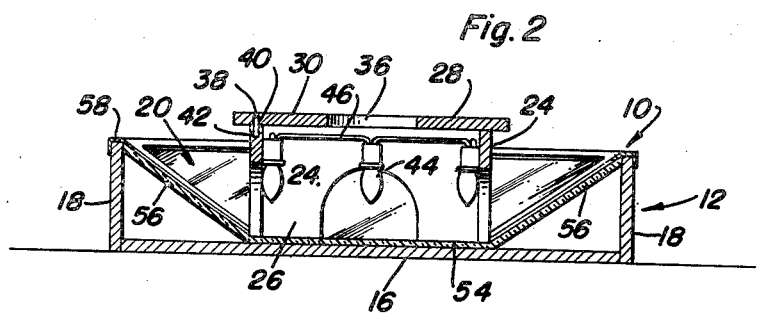
Figure 2 is a cross sectional view of the stand.

Referring now more specifically to the accompanying drawings, wherein like numerals designate like parts throughout the various views, the numeral 10 designates the supporting stand or base of the present invention in its entirety.

The stand 10 comprises basically a receptacle or container 12 and a housing 14. The receptacle 12 is in the form of a square box having a bottom 16 and vertical side walls 18 with an open top 20. The bottom 16 and the sides 18 may be secured to one another in any conventional manner such as nails, screws, glue or any other conventional means.

The housing 14, like the receptacle 12, is in the form of a square box and comprises a closed top or top wall 22 and vertical side walls 24 with an open bottom 26.

The housing 14 is disposed within the receptacle 12 with each of the housing side walls 24 being parallel to an adjacent side wall 18 of the receptacle with each of the housing side walls being spaced equidistant from the inner surfaces of the receptacle side walls; in other words, the housing 14 is disposed concentrically within the receptacle 12 and is inversely related thereto. The side walls 24 of the housing 14 are secured to the bottom 16 of the receptacle 12 in any conventional manner.

In order to dispose the lower portion of an artificial tree within the housing 14, the top wall 22 of the housing is formed of two separable right triangular sections 28 and 30 which have corresponding semicircular notches 32 and 34 cut centrally in the hypotenusal edges thereof to form a circular aperture or opening 36 through which the tree trunk extends. The section 30 has a groove 38 on the underside thereof running parallel to and adjacent the right angular side edges thereof. Secured within the groove 38 is a vertically depending strip 40. The edges of the side walls 24 upon which the section 30 rests are grooved as at 42 to align with grooves 38 and the depending strip or tongue 40 removably seats in the groove 42 thereby permitting the section 30 to be detached from the housing to facilitate insertion of the lower portion of an artificial tree. Although this is the preferred means of removably mounting the section 30, it will be understood that other means such as dowel pins and cooperating bores could be utilized to facilitate this removable mounting.

Secured to the inner surfaces of the housing side walls 24 adjacent the top wall 22 are a plurality of illuminating means in the form of conventional Christmas tree bulbs and sockets 44 preferably connected in parallel with one another by conductors 46 terminating in cord 48 having a male plug 50 thereon for connection with any conventional outlet whereby current may be conducted to the lights 44.

Archways or openings 52 are notched centrally from the lower edge of each side wall 24 of the housing 14 for projecting, or permitting the passage of light or illumination generated by the lights 44 from the housing and into the receptacle 12. To further enhance the passage of illumination from the housing 14, a panel 54 having reflecting surfaces thereon is secured to the inner surface of the bottom wall 16 and disposed within the housing to reflect light through the opening 36 and the archways 52.

Figure 3:
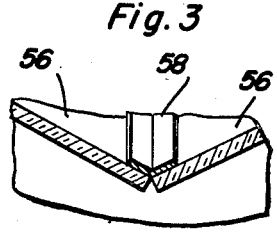
Figure 3 is a cross sectional view of a portion of the stand taken along section line 3—3 of Figure 1 showing the detail of connecting the reflective side panels to one another.

Upwardly diverging panels 56 are disposed around the housing 14 and have their lower edges abutting the lower edges of the side walls 24 of the housing and their upper edges abutting the upper edges of the side walls 18 of the receptacle. These side panels 56, like the panels 54 have reflecting surfaces thereon and in effect form mirrors for reflecting light passing from the housing conically upward through the open top of the receptacle to illuminate the upper portion of the tree which may be supported in the stand. Each of the side panels 56 is of truncated triangular form with the upper and lower edges thereof being parallel to one another so that when placed in the receptacle 12, their adjacent edges will abut throughout their length, as seen clearly in Figure 3.

To conceal the slots formed where the mirrors or side panels 56 abut one another and the top edges of the side walls 18, and also to prevent chipping of the edges of the mirrored surfaces, metallic strips 58 are disposed in overlying relation to the mating edges.

If desired, the outside of the stand 10 may be finished with a type of cotton having silvery cuttings therein to give the stand a glittering effect. Further, it is obvious that any variety of colored lights may be used to give a rainbow effect to the branches of the tree supported in the stand and it is to be noted that although the stand is shown in the preferred embodiment as being square, it may be of other shapes without departing from the spirit of the invention.

As will be seen, with the section 30 detached, a tree may be stood on the butt of its trunk on the panel 54 and the trunk slid laterally into the notch 32 after which the section 30 may be attached with its notch receiving said trunk. This procedure obviates fishing with the butt of the trunk for the aperture formed by said notches 32, 34 and binding of the trunk in the notches by attempting to insert the butt downwardly through the opening 36.

In fact, since numerous modifications and changes will readily occur to those skilled in the arts, after a consideration of the foregoing specification and accompanying drawings, it is not desired to limit the invention to the exact construction shown and described, but all suitable modifications and equivalents may be resorted to falling witihin the scope of the appended claims.

Having described the invention, what is claimed as new is:

1. An illuminating stand for an artificial Christmas tree comprising a rectangular open top receptacle having a bottom and sides, a rectangular flat reflecting panel centered on said bottom with its edges parallel with and spaced from said sides, reflecting side panels in said receptacle inclining upwardly and outwardly from said edges to the top of said receptacle and mating edge to edge, a rectangular open bottom housing of the same size as said rectangular panel having side walls seating on said rectangular panel and centered thereon by said reflecting side panels, said housing having an opaque flat top provided with a central opening for receiving the trunk of a tree seated on said rectangular panel, the side walls of said housing having central bottom notches therein, and electric lamps in said housing at said notches, said rectangular reflecting panels reflecting the light rays from said lamps outwardly through said notches, said reflecting side panels reflecting such light rays upwardly out of said receptacle.

2. An illuminating stand according to claim 1, said opaque top comprising half sections with one half of said opening in each section, one of said half sections being detachable from said housing for insertion of a tree trunk laterally in one half of the opening and said one section being attachable to said housing to position said tree laterally in the other half of the opening.

References Cited in the file of this patent

UNITED STATES PATENTS

| Number | Name | Date |
|---|---|---|
| 718,496 | Meagher | Jan. 13, 1903 |
| 744,692 | Ryan | Nov. 17, 1903 |
| 1,492,324 | Hoover | Apr. 29, 1924 |
| 2,009,340 | Edwards | July 23, 1935 |
| 2,058,677 | Fritz | Oct. 27, 1936 |
| 2,297,191 | Parman | Sept. 29, 1942 |
| 2,580,699 | Pfetzing | Jan. 1, 1952 |